United States Patent
Richter et al.

(10) Patent No.: US 9,398,744 B2
(45) Date of Patent: Jul. 26, 2016

(54) DRIVE SYSTEM FOR DRIVING A CHOPPER AND FEEDER DEVICE OF A HARVESTING MACHINE

(71) Applicant: Linde Hydraulics GmbH & Co. KG, Aschaffenburg (DE)

(72) Inventors: Daniel Richter, Hosbach (DE); Thomas Loeffler, Waldaschaff (DE); Bernward Welschof, Grobostheim (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 433 days.

(21) Appl. No.: 13/955,021

(22) Filed: Jul. 31, 2013

(65) Prior Publication Data

US 2014/0162738 A1    Jun. 12, 2014

(30) Foreign Application Priority Data

Aug. 7, 2012   (DE) .................. 10 2012 107 227

(51) Int. Cl.
| | |
|---|---|
| *A01F 12/16* | (2006.01) |
| *A01F 29/16* | (2006.01) |
| *F16H 61/4043* | (2010.01) |
| *A01D 75/18* | (2006.01) |
| *A01F 29/10* | (2006.01) |
| *A01F 29/14* | (2006.01) |

(52) U.S. Cl.
CPC .............. *A01F 29/16* (2013.01); *A01D 75/187* (2013.01); *A01F 29/10* (2013.01); *A01F 29/14* (2013.01); *F16H 61/4043* (2013.01)

(58) Field of Classification Search
CPC ......... A01F 29/10; A01F 29/14; A01F 29/16; A01D 41/1274; A01D 75/187; A01D 43/085; A01D 43/087; F16H 61/4043; F16H 61/4104; F16H 61/4157; F16H 61/42

USPC ........ 460/3; 56/10.2 J, 10.2 R, 16.6, 60, 504; 60/403, 490, 436, 445
See application file for complete search history.

(56) References Cited

U.S. PATENT DOCUMENTS

| | | | | |
|---|---|---|---|---|
| 5,921,071 | A * | 7/1999 | Paquet | A01F 29/16 241/34 |
| 6,564,549 | B2 * | 5/2003 | Nagura | B60T 1/08 60/436 |
| 7,464,525 | B2 * | 12/2008 | Dueckinghaus | F16H 61/4043 56/10.2 J |
| 7,721,515 | B2 * | 5/2010 | Pollklas | A01D 43/085 56/10.2 J |
| 8,869,522 | B2 * | 10/2014 | Bohrer | A01D 41/1274 56/10.2 J |

FOREIGN PATENT DOCUMENTS

| | | |
|---|---|---|
| EP | 1721518 A1 | 11/2006 |
| WO | 0209498 A1 | 2/2002 |

* cited by examiner

*Primary Examiner* — Robert Pezzuto (74) *Attorney, Agent, or Firm* — The Webb Law Firm (57) ABSTRACT

A drive system (1) for a harvesting machine has a drive train (4) connected by a coupling device (5) with a drive motor (6). The drive train (4) has a hydrostatic transmission (10) with a variable displacement pump (11) and a hydraulic motor (12) connected in a closed circuit to the pump (11). The hydraulic motor (12) is connected to a feeder device (2). For quickly stopping the feeder device (2), the pump (11) is set to a displacement of zero by an electronic control system (15) and the feeder device (2) is braked by a pressure protection device (40). For a chopper device (3), the hydraulic motor (12) is cut off by the electronic control system (15). The drive train (4) is isolated from the drive motor (6) by uncoupling the coupling device (5) and the pump (11) is set to the maximum displacement volume.

19 Claims, 3 Drawing Sheets

DRIVE SYSTEM FOR DRIVING A CHOPPER AND FEEDER DEVICE OF A HARVESTING MACHINE

CROSS REFERENCE TO RELATED APPLICATION

This application claims priority to German Patent Application No. DE 10 2012 107 227.2 filed Aug. 7, 2012, which is herein incorporated by reference in its entirety.

BACKGROUND OF THE INVENTION

1. Field of the Invention

This invention relates to a drive system for driving a chopper and feeder device of a harvesting machine, in particular a forage harvester. The chopper and feeder device has a feed apparatus and a chopper apparatus. A drive train is provided for driving the feeder device and the chopper device. The drive train is connected by a coupling device with a drive motor. For driving the feeder device, the drive train has a hydrostatic transmission which includes a pump driven by the drive train and a hydraulic motor connected in a closed circuit to the pump. The hydraulic motor is in a driving connection with the feeder device. A fast stop function is provided, with which the chopper and feeder device is cut off when a foreign object is detected. An electronic control system is in communication with a foreign object detector.

2. Description of Related Art

Forage harvesters take in a crop to be harvested via an attachment. The crop then travels through a feeder device, which is generally formed by a plurality of feed rollers and pre-compression rollers, to a chopper device, generally a chopper drum in which the harvested material is chopped into smaller pieces. After the chopper device, the chopped harvested material is transported into an ejector shaft, in which a treatment device and an ejector blower are optionally located, to transport the chopped harvested material from the forage harvester to a truck.

On conventional forage harvesters, there is a risk that, in addition to the product to be harvested, foreign objects, such as stones or metal parts, can be taken in which can cause significant damage if the foreign objects get into the chopper device with the stream of harvested material. To prevent damage of this type, it is known that foreign objects in the harvested material can be detected with a foreign object detector. If a foreign object is detected, the feeder device can be stopped quickly by an electronic control device, which shuts down the feeder device in a short period of time. To safely prevent a foreign object from getting into the chopper device as it slows to a stop, the chopper device is also shut down quickly. Stopping the chopper device also makes it possible for an operator to safely examine the harvested material to find the foreign object and remove it from the harvested material.

WO 02/09498 A1 describes a forage harvester with a hydraulically driven feeder device, in which, for the fast stopping of the feeder device, a fast stop valve is located in the closed circuit for the drive of the feeder device. To quickly stop the feeder device, the fast stop valve is actuated into a closed position in which a hydraulic fluid line of the closed circuit that forms the return line of the hydraulic motor is shut off and the displacement volume flow supplied to the hydraulic motor by the pump is diverted into a bypass. However, on account of the fast stop valve and the bypass line required, a drive system of this type entails a great deal of added construction effort and expense.

EP 1 721 518 A1 describes a drive system of a forage harvester in which, for the fast stopping of the feeder device when a foreign object is encountered, a switched valve arrangement is located in a hydraulic line of the closed circuit. For quickly stopping the feeder device, the switched valve arrangement closes off the hydraulic line of the closed circuit that forms the return side of the hydraulic motor and carries the delivery flow from the pump past the hydraulic motor into a bypass. To bring the chopper device to a complete stop, an additional brake valve is located on the pump which can shut off a hydraulic line of the closed circuit to brake the chopper device. However, on account of the presence of the switched valve arrangement, the required bypass line, and the additional brake valve, a drive system of this type entails a great deal of added construction effort and expense.

Therefore, it is an object of the invention to provide a drive system of the general type described above with which, when a foreign object is detected in the material being harvested, a fast cutoff of the feeder device and of the chopper device can be achieved with little added construction effort and expense.

SUMMARY OF THE INVENTION

The invention teaches that this object can be accomplished with a hydrostatic transmission that has a variable displacement pump with a variable displacement volume. The pump is actuated electrically and a pressure protection device is associated with the hydrostatic transmission. For the fast stop function of the feeder device, when a foreign object is detected by the foreign object detector, the variable displacement pump is set to a volumetric displacement of zero and the feeder device is braked by the pressure protection device of the closed circuit. For the fast stop function of the chopper device, when the variable displacement pump is set to a displacement of zero, the hydraulic motor is cut off by the electronic control unit. The drive train is then isolated from the drive motor by uncoupling a coupling device, which can be actuated by the electronic control system. The variable displacement pump is set by the electronic control unit to a maximum displacement volume and the chopper device is braked by the pressure protection device of the closed circuit.

With the invention, for rapid braking of the feeder device when a foreign object is detected, the pump, which is in the form of a variable displacement pump of the closed circuit, is set to a displacement of zero. In this position, the pump no longer delivers any flow, so that the hydraulic motor is driven by the mass inertia of the feeder device and operates as a pump. In this state, the hydraulic motor delivers a volume flow via the pressure protection device of the closed circuit (which is already present), so that the feeder device is braked to a stop in a short period of time. To then be able to brake the chopper device in a short period of time, the pump remains in the position with a displacement of zero and, with the pump set to a displacement of zero, the hydraulic motor is cut off by the electronic control unit. After the cutoff of the hydraulic motor, the drive train is then isolated from the drive motor by uncoupling the coupling device, which can be actuated by the electronic control unit, and the variable displacement pump is set by the electronic control unit to the maximum displacement volume. The pump, which is normally driven by the drive motor, is therefore isolated from the drive motor and is driven by the chopper device, which is still running. As a result of the setting of the pump to the maximum displacement volume, the pump, which is being driven by the chopper device, delivers a volume flow which, however, does not cause any rotational movement of the hydraulic motor which is cut off, so that the pump delivers the volume flow via the pressure protection device (which is already present) of the closed circuit and the chopper device is braked to a stop in a short period of time.

Braking of the feeder device and of the chopper device takes place via the pressure protection device, which is already present in the closed circuit, and protects the closed circuit against overpressure. Consequently, a simple construction is achieved with little added construction effort and expense, because none of the valves located in the hydraulic lines of the closed circuit is necessary to build up a braking pressure. In addition, the invention does not require a bypass line to bypass the hydraulic motor, which further reduces the construction effort and expense. In the invention, the pump, the displacement of which can be set electrically, is preferably in the form of a unit with a fast reaction time which, within an extremely short period of time, for example within a few milliseconds, can be set to a displacement of zero to quickly stop the feeder device, and to quickly stop the chopper device after the shutdown of the hydraulic motor can be switched from a displacement of zero to the maximum displacement.

For braking the chopper device, a cutoff of the hydraulic motor is provided to prevent restarting of the feeder device as a result of switching the pump to the maximum displacement for braking the chopper device.

In one advantageous embodiment of the invention, the hydraulic motor is a variable displacement motor, which can be switched in its intake volume between a position with an intake volume of zero and a position with the maximum intake volume, and which is actuated electrically. The hydraulic motor is set by the electronic control system to cut off the hydraulic motor by switching it to the position with zero displacement. With an electrically variable displacement motor of this type, it is easily possible to cut off the hydraulic motor by means of the electronic control system by setting it to a displacement of zero, and to decelerate and stop the chopper device by setting the pump to the maximum displacement. The hydraulic motor is preferably a two-position motor which can be switched only between the position with the displacement volume of zero and the position with the maximum displacement volume. A variable displacement motor of this type requires little added construction effort or expense and makes it possible to cut off the hydraulic motor in a simple manner.

In one advantageous embodiment of the invention, the hydraulic motor, in the unactuated status, is set to the position with a displacement volume of zero. Consequently, short actuation times of the hydraulic motor can be achieved and, thus, the chopper device can be braked in a short time.

In an alternative embodiment of the invention, the hydraulic motor is a constant displacement motor with a constant displacement volume. To cut off the hydraulic motor, a shutoff valve, that can be electrically actuated by the electronic control system, is located in a hydraulic line of the closed circuit. With a shutoff valve of this type, it is possible, in a simple manner, after the fast stopping of the feeder device, to shut off the connection between the pump and the hydraulic motor so that the chopper device can be decelerated and stopped by setting the pump to the maximum displacement. The shutoff valve can be located in the inflow side or the return-side hydraulic line of the hydraulic motor. It is particularly advantageous if the shutoff valve is located in the inflow-side hydraulic line of the hydraulic motor. In the shutoff position of the shutoff valve, no displacement flow can be delivered by the pump to the hydraulic motor, so that, by setting the pump to the maximum displacement, the chopper device can be decelerated and the hydraulic motor is not acted on by the braking pressure. A shutoff valve of this type, which after the fast stop of the feeder device is actuated into the shutoff position to allow braking of the chopper device, requires less construction effort and expense than the valves from the known art.

To cut off the hydraulic motor, the shutoff valve is advantageously actuated by the electronic control system into a shutoff position in which it shuts off (closes) the hydraulic line. As a result of this actuation, the flow delivered by the pump can no longer flow to the hydraulic motor, so that, by means of the pressure protection device, the chopper device can be decelerated in a simple manner in a short period of time.

It is particularly advantageous if the shutoff valve is actuated between the open position and a shutoff position by an electrically actuated pilot valve. The pilot valve is actuated by the electronic control system. With an electrically actuated pilot valve of this type, the shutoff valve can be actuated in a simple manner from the open position into the shutoff position by the electronic control system.

In one advantageous embodiment of the invention, the shutoff valve has a control pressure chamber that acts in the direction of a shutoff position. The control pressure chamber is in communication with the hydraulic line. The pilot valve is associated with the control pressure chamber and, in an open position, depressurizes the control pressure chamber to a reservoir and in a closed position shuts off the communication of the control pressure chamber with the reservoir. By cutting off the control pressure chamber, which is in communication with the hydraulic line and acts in the direction of the shutoff position, a control pressure can be generated in a simple manner in the control pressure chamber of the shutoff valve that actuates the shutoff valve into the shutoff position.

To cut off the hydraulic motor, the pilot valve is preferably actuated by the electronic control system into the shutoff position. Consequently, it is possible in a simple manner to switch the shutoff valve into the shutoff position to cut off the hydraulic motor.

If the pilot valve is switched into the shutoff position in the non-actuated position, there are advantages with respect to the reaction time of the shutoff valve, so that the chopper device can be braked to a stop in a short period of time.

In an alternative embodiment of the invention, the hydraulic motor is a constant displacement motor with a constant displacement volume. To cut off the hydraulic motor, a mechanical braking device is provided that is in communication with the hydraulic motor. The braking device is switched by the electronic control unit between a braking position and a released position. With a braking device that brakes the hydraulic motor and keeps it in the stopped position, it is also possible, with little added construction effort or expense, to achieve a cutoff of the hydraulic motor after the fast stopping of the feeder device, so that the chopper device can be decelerated and stopped by setting the pump to the maximum displacement.

To cut off the hydraulic motor, the electronic control system preferably actuates the braking device into the braking position. As a result, the volumetric flow delivered by the pump does not result in a startup of the hydraulic motor. Thus, the hydraulic motor, which is kept at a stop by the braking device, does not take in any volumetric flow, so that the chopper device can be decelerated in a short period of time in a simple manner and by means of the pressure protection device.

It is particularly advantageous if the braking device is a hydraulically actuatable spring-loaded brake. To actuate the braking device between the braking position and a released position, an electrically actuatable control valve is provided, which is controlled by the electronic control system. A spring-loaded brake, which is actuated into the braking position by a control valve controlled by the control system, makes it possible, with little added construction effort or expense, to generate a corresponding braking torque on the hydraulic motor which prevents the feeder device from restarting when the chopper device is braked.

The spring-loaded brake can be actuated between the released position and the braking position in a simple manner if the control valve has a release position in which a brake release pressure chamber of the spring-loaded brake is in communication with a control pressure source and a braking position in which the brake release pressure chamber is depressurized to a reservoir. To cut off the hydraulic motor, the control valve is preferably placed in the braking position by the control system. The volumetric flow delivered by the pump, therefore, does not result in a starting of the hydraulic motor, so that the chopper device can be brought to a stop in a short period of time by the pressure protection device.

If, in the non-actuated state, the control valve is placed in the braking position, there are advantages with regard to the reaction time of the spring-loaded brake, so that the chopper device can be braked to a stop in a short period of time.

In one advantageous development of the invention, the coupling device is a magnetic coupling that is actuated by the electronic control system.

With a magnetic coupling of this type, when a foreign object is detected, the control system uncouples the drive motor from the drive train and, thus, from the pump in a simple manner, so that the chopper device is braked to a stop by setting the pump to the maximum displacement volume.

The pressure protection device preferably comprises pressure limiting valves which are associated with the hydraulic lines of the closed circuit. With pressure limiting valves of this type, which are preferably reciprocally interconnected, it is possible in a simple manner to protect the closed circuit against overpressures and pressure surges, and without additional valves to generate a braking pressure for the rapid braking of the feeder device and of the chopper device.

If, as in one development of the invention, anti-cavitation valves are associated with the hydraulic lines of the closed circuit, it is possible in a simple manner, in the event of a fast stop of the feeder device and in the event of a fast stop of the chopper device, to prevent a drop in pressure in the low-pressure-side hydraulic line of the closed circuit.

The invention also relates to a harvester machine, in particular a forage harvester, with a drive system of the invention.

BRIEF DESCRIPTION OF THE DRAWINGS

Additional advantages and details of the invention are explained in greater detail below with reference to the exemplary embodiments illustrated in the accompanying schematic figures.

DESCRIPTION OF THE PREFERRED EMBODIMENTS

Figure 1:
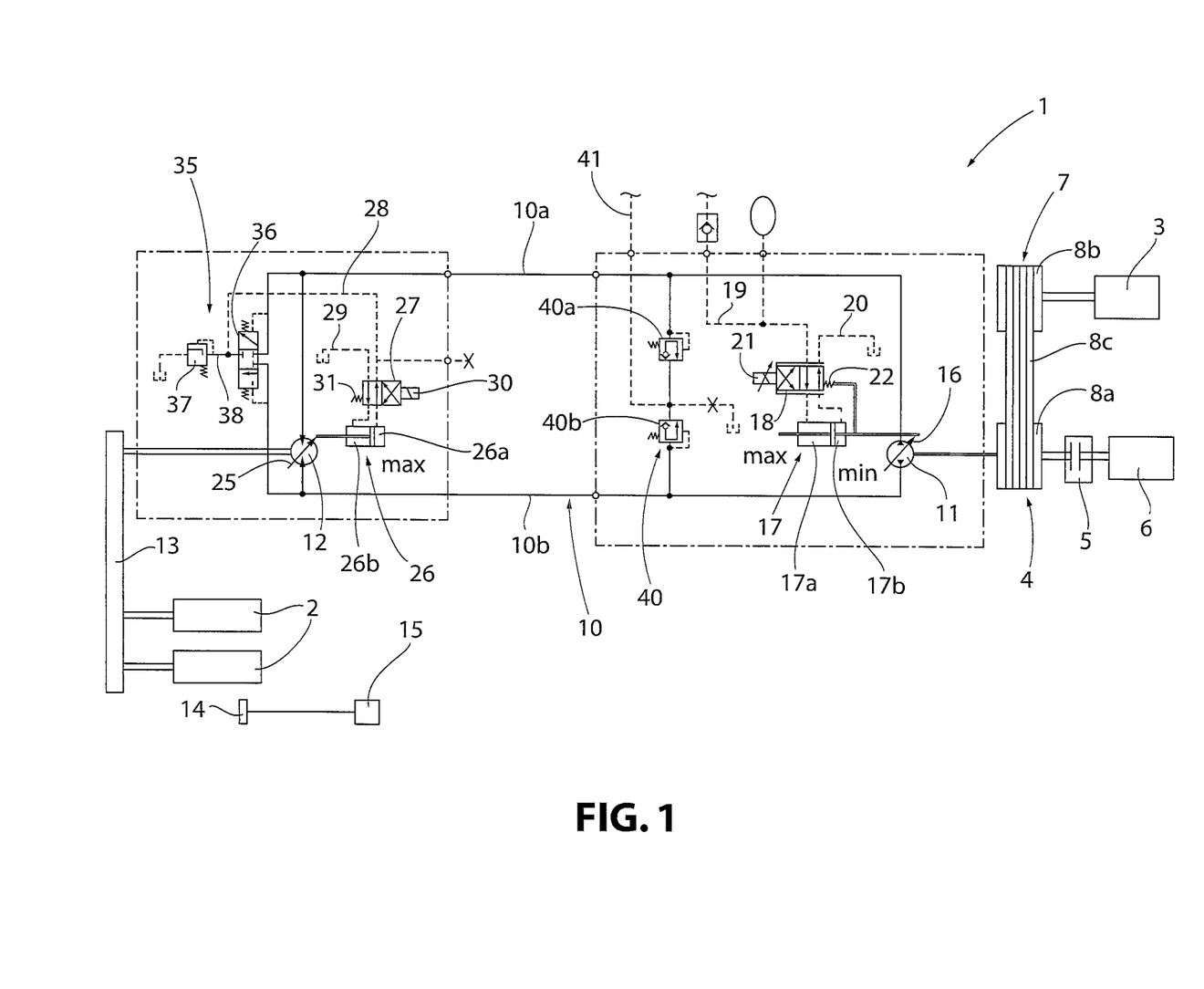
FIG. 1 shows a first exemplary embodiment of a drive system of the invention.

FIG. 1 illustrates a first embodiment of a drive system 1 for driving a chopper and feeder device of a harvester machine, such as a forage harvester. The chopper and feeder device comprises a feeder device 2 formed by a feeder conveyor, which, for example, comprises a plurality of feed rollers and pre-compression rollers. By means of the feeder device 2, harvested material is fed into the forage harvester. In the flow of harvested material downstream of the feeder device 2, there is a chopper device 3 to chop the harvested material. The chopper device 3 is formed, for example, by a chopper drum in the form of a bladed drum.

A drive train 4 is provided for driving the feeder device 2 and the chopper device 3. The drive train 4 is in communication via a coupling device 5 with a drive motor 6, which can be, for example, an internal combustion motor in the form of a diesel motor.

For driving the chopper device 3, the drive train 4 has a transmission 7, which, in the illustrated exemplary embodiment, is in the form of a belt system 8 with belt pulleys 8a, 8b and a drive belt 8c which is looped around the belt pulleys 8a, 8b.

For driving the feeder device 2, the drive system 1 comprises a hydrostatic transmission 10, which comprises a hydrostatic pump 11 driven by the drive train 4 and a hydraulic motor 12 connected in a closed circuit to the pump 11. In the illustrated exemplary embodiment, the hydraulic motor 12 is in communication via a transmission 13 with the feeder device 2. The transmission 13 can be in the form of a mechanical power divider gear or a mechanical gear mechanism.

The drive system 1 further comprises, in the vicinity of the feeder device 2, a foreign object detector 14, which can detect foreign objects in the harvested material, and is in communication with an electronic control system 15.

The coupling device 5 is preferably in the form of a magnetic coupling, which is in communication with the electronic control system 15 for actuation.

The closed circuit for driving the feeder device is formed by hydraulic lines 10a, 10b. The pump 11 of the hydrostatic transmission 10 is a variable displacement pump 11, which is actuated electrically. The pump 11 can be adjusted continuously between a position with minimum displacement and a position with maximum displacement. For this purpose, a displacement volume adjustment device 16, such as, for example, a swashplate with an adjustable inclination, of a pump in the form of an axial piston machine that employs a swashplate construction, is in communication with a positioning cylinder device 17. The positioning cylinder device 17 has two control pressure chambers 17a, 17b which act in opposite directions, the pressurization of which at a control pressure can be controlled by an electrically actuatable positioning valve 18. The positioning valve 18 is in communication with a control pressure line 19 which carries a control pressure, a reservoir line 20 that leads to a reservoir, and by means of corresponding control pressure lines with the two control pressure compartments 17a, 17b. In the illustrated control position of the positioning valve 18, which acts as a throttle in intermediate positions and being a proportional valve, the control pressure chamber 17a is pressurized at a control pressure and the control pressure chamber 17b is depressurized to the reservoir, as a result of which the pump 11 is set toward the minimum displacement volume. By means of an electrical actuator device 21, such as a proportional magnet, for example, the positioning valve 18 can be actuated against the force of a spring device 22 into a control position illustrated on the left in FIG. 1. In this control position, the control pressure chamber 17b is pressurized at a control pressure and the control pressure chamber 17a is depressurized to the reservoir, as a result of which the pump 11 is set toward the maximum displacement volume. The spring device 22 is in an operative connection with the displacement volume control device 16 which provides feedback on the position of the displacement volume control device 16. The actuator device 21 is in communication with the electronic control system 15 for its actuation.

In the exemplary embodiment illustrated in FIG. 1, the hydraulic motor 12 is a variable displacement motor with a displacement volume that can be varied between a position with a displacement volume of zero and a position with a maximum displacement volume. In this case, a displacement variation device 25, such as a swashplate with a variable angle of inclination, for example, of a hydraulic motor in the form of an axial piston machine employing a swashplate construction, is in communication with a positioning piston device 26. The positioning piston device 26 has two control pressure chambers 26a, 26b which act in opposite directions, the pressurization of which can be controlled with a control pressure by an electrically actuatable positioning valve 27. The positioning valve 27 is in communication with a control pressure line 28 that carries a control pressure, a reservoir line 29 that leads to a reservoir, and by means of corresponding control pressure lines with the two control pressure chambers 26a, 26b. The variable displacement motor 12 is a two-position motor, which can be switched only between the position with a displacement volume of zero and the position with the maximum displacement volume. The positioning valve 27 that controls this action is a switched valve.

In the illustrated switched position of the positioning valve 26 in the form of a switched valve, the control pressure chamber 26a is pressurized with a control pressure and the control pressure chamber 26b is depressurized to the reservoir, as a result of which the hydraulic motor 12 is set to the displacement volume of zero. By means of an electrical actuator device 30, such as a switching magnet, for example, the switched valve 27 can be actuated into a switched position illustrated on the right in FIG. 1. In this switched position, the control pressure chamber 26b is pressurized at a control pressure and the control pressure chamber 26a is depressurized to the reservoir, as a result of which the hydraulic motor 12 is set to the maximum displacement volume. The positioning valve 26 is actuated by the electrical actuator device 30 against the force of a spring 31 so that, when the actuator device 30 is de-energized, the hydraulic motor 12 is set to a displacement volume of zero. The actuator device 30 is in communication with the electronic control system 15 for actuation.

The closed circuit further comprises a discharge device 35 with a selector valve 36 and a discharge valve 37 in the form of a pressure limiting valve, with which a flow of hydraulic fluid can be discharged from the low-pressure side of the closed circuit into a reservoir. In the illustrated exemplary embodiment, the discharge device 35 also generates the control pressure for actuation of the positioning cylinder device 26, for which purpose the control pressure line 28 is connected to a discharge line 38 between the selector valve 36 and the discharge valve 37.

For the maximum pressure protection of the high-pressure side of the closed circuit, a pressure protection device 40 is provided, which is formed by a pressure limiting valve 40a associated with the hydraulic line 10a and a pressure limiting valve 40b associated with the hydraulic line 10b. In the illustrated exemplary embodiment, the pressure limiting valves 40a, 40b are combined pressure limiting and anti-cavitation valves which, by means of the anti-cavitation valves which are in the form of check valves, make it possible to feed a flushing volume flow into the low-pressure side of the closed circuit. For this purpose, the combined pressure limiting and anti-cavitation valves are connected to a feed line 41. The pressure limiting valves 40a, 40b, which are combined pressure limiting and anti-cavitation valves, are switched in opposition to each other, so that when the pressure limiting valve 40a or 40b, respectively, associated with the high-pressure-side hydraulic line 10a or 10b, respectively, responds, hydraulic fluid can flow out via the anti-cavitation valve of the respective other pressure limiting valve 40b or 40a into the low-pressure-side hydraulic line 10b or 10a, respectively.

Figure 2:
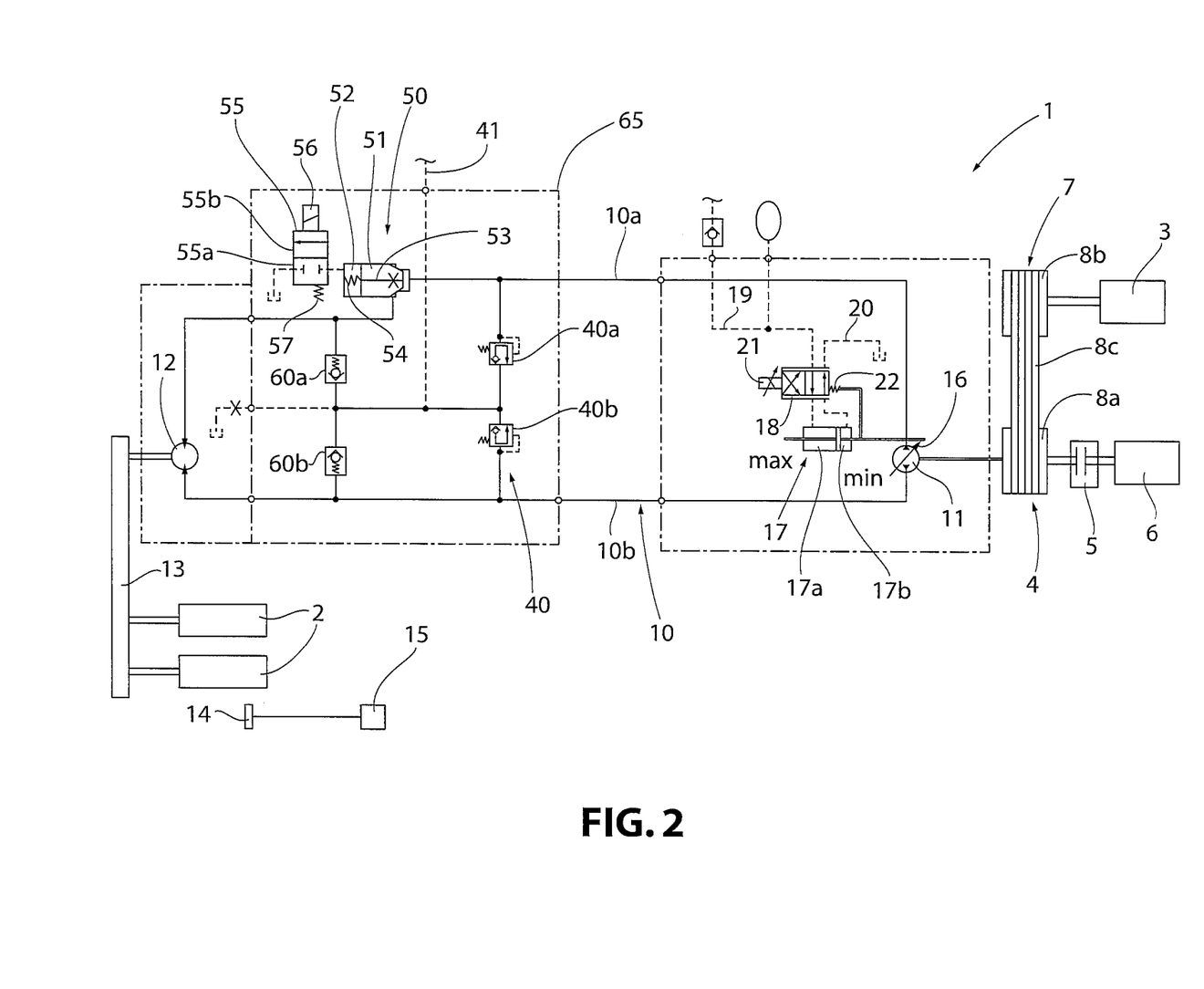
FIG. 2 shows a second exemplary embodiment of a drive system of the invention.

FIG. 2 illustrates a second exemplary embodiment of a drive system of the invention. Components that are the same as illustrated in FIG. 1 are identified by the same reference numbers.

In FIG. 2, the hydraulic motor 12 is a constant displacement motor with a constant displacement volume. Located in the hydraulic line 10a is a shutoff valve 50 that is actuated by the electronic control system 15. The shutoff valve 50 is a normally open valve that employs a seat-valve construction and has a valve body 51, which actuates a valve seat in a housing. The valve body 51 is actuated into an open position by the hydraulic fluid in the hydraulic line 10a flowing into the hydraulic motor 12. For actuation of the valve body 51 into a closed position, which cuts off the hydraulic line 10a, a control pressure chamber 52 is provided which is in communication by a control line 53 in the valve body 51 with the hydraulic line 10a. Also located in the control pressure chamber 52 is a spring 54, which actuates the valve body 51 into the closed position. The shutoff valve 50 is actuated between the open position and the closed position by an electrically actuated pilot valve 55, which is in the form of a switched valve. The pilot valve 55 is located in a discharge line that connects the control pressure chamber 52 with the reservoir and has a closed position 55a and an open position 55b.

In the open position 55b, the control pressure chamber 52 that acts in the direction of the closed position is depressurized to the reservoir, so that the shutoff valve 50 is activated into the open position by the hydraulic fluid flowing in the hydraulic line 10a and flowing into the hydraulic motor 12. In the closed position 55a, the connection between the control pressure chamber 52 and the reservoir is cut off, so that by means of the control line 53 a control pressure is generated in the control pressure chamber 52 which, together with the spring 54, actuates the shutoff valve 50 into the closed position in which the displacement delivered by the pump 11 can no longer flow to the hydraulic motor 12.

The pilot valve 55, which is in the form of a switched valve, is actuated by an electrical actuator device 56, such as a switching magnet, for example. In the illustrated exemplary embodiment, the pilot valve 55 is actuated by a spring 57 into the closed position 55a and by the actuator device 56 into the open position 55b, so that, when the actuator device 56 is not energized, the pilot valve 55 is actuated into the closed position 55a and the shut off valve 50 is accordingly actuated into the closed position to cut off the hydraulic line 10a. The actuator device 56 is in communication with the electronic control system 15 for actuation.

In FIG. 2, anti-cavitation valves 60a, 60b are also provided which are check valves that open in the direction of the hydraulic lines 10a and 10b, respectively, and are connected to the feed line 41.

The shutoff valve 50 controlled by the pilot valve 55 is located together with the pressure limiting device 40 and the anti-cavitation valves 60a, 60b in a valve block 65.

The discharge device 35 is not illustrated in additional detail in FIG. 2.

Figure 3:
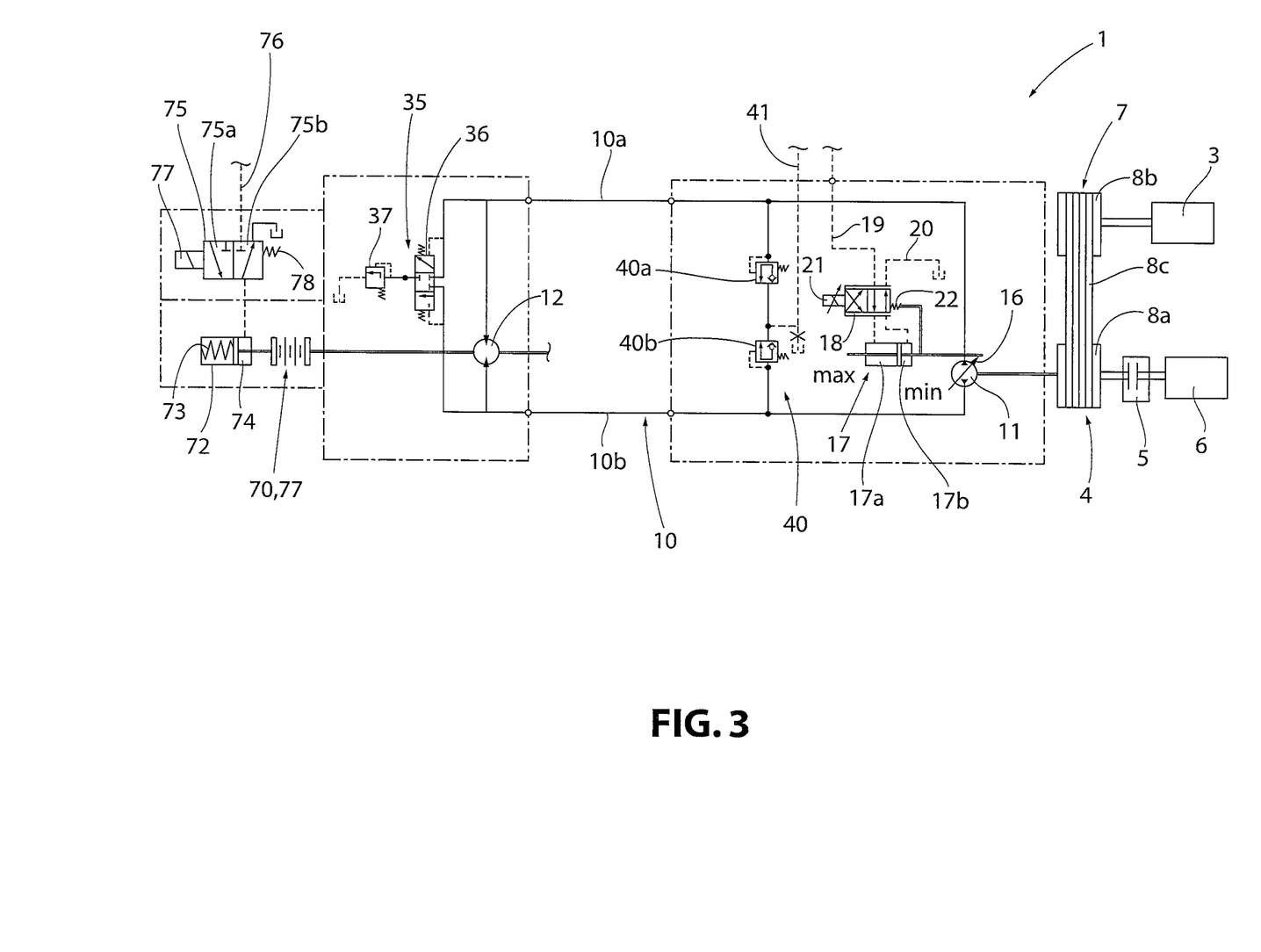
FIG. 3 shows a third exemplary embodiment of a drive system of the invention.

FIG. 3 illustrates a third exemplary embodiment of a drive system of the invention. Components that are the same as those illustrated in FIGS. 1 and 2 are identified with the same reference numbers.

In FIG. 3, the hydraulic motor 12 is a constant displacement motor with a constant displacement volume. Associated with the hydraulic motor 12 is a mechanical braking device 70 which is actuated by the electronic control system 15 between a released position and a braking position. The braking device 70 is preferably a hydraulically releasable spring-loaded brake 71, in the form of a multiple disc brake, for example. The braking device 70 has an actuator 72 on which there is a spring device 73 that acts in the direction of the braking position and a brake release pressure chamber 74 that acts in the direction of the release position.

For actuation of the braking device 70, an electrically actuated control valve 75, in the form of a switched valve, is provided which in a release position 75a connects the brake release pressure chamber 74 with a control pressure source 76 and in a braking position 75b depressurizes the brake release pressure chamber 74 to a reservoir.

The control valve 75, which is in the form of a switched valve, is actuated by an electrical actuator device 77, such as a switching magnet, for example. In the illustrated exemplary embodiment, the control valve 75 is actuated by a spring 78 into the braking position 75b and by the actuator device 77 into the released position 75a, so that when the actuator device 77 is not energized, the control valve 75 is actuated into the braking position 75b and the braking device 70 is accordingly actuated by the spring device 73 into the braking position. The actuator device 77 is connected with the electronic control system 15 for actuation.

The feeder device 2 driven by the hydraulic motor 12 is not illustrated in any further detail in FIG. 3.

The drive system illustrated in FIGS. 1-3 works as follows. In normal drive operation to drive the chopper device 3 and the feeder device 2, the coupling device 5 connects the drive motor 6 with the drive train 4 so that the chopper device 3 is driven by the transmission 7 and the feeder device 2 is driven by the hydrostatic transmission 10. The pump 11, which is driven by the drive motor 6 by means of the drive train 4, with a corresponding setting of the displacement, delivers into the feed-side hydraulic line 10a, which therefore forms the high-pressure side of the closed circuit. Accordingly, the hydraulic line 10b forms the return side and the low-pressure side of the closed circuit. The pressure limiting device 40a protects the high-pressure side of the closed circuit against overpressure. In FIG. 1, the hydraulic motor 12 is switched by actuation of the actuator device 30 of the positioning valve 27 into the position with maximum displacement volume. In FIG. 2, the shutoff valve 50 is actuated into the open position, for which purpose the actuator device 56 of the pilot valve 55 is actuated and, thus, the pilot valve 55 is actuated into the open position 55b. In FIG. 3, the braking device 70 is released by the actuation of the actuator device 77 of the control valve 75 into the released position 75a.

If a foreign object is detected by the foreign object detector 14, the electronic control system 15 initiates a fast stop of the feeder device 2, in which the feeder device 2 is braked to a stop in a short period of time. For this purpose, the control system 15 sets the pump 11 to a displacement volume of zero by a corresponding actuation of the actuator device 21 and, thus, of the positioning valve 18 so that the pump 11 neither delivers nor takes in any flow. The hydraulic motor 12 is thereby driven by the mass inertia of the feeder device 2 so that the hydraulic motor 12 operates as a pump and, with a reversal of the pressure relationships in the closed circuit, delivers into the hydraulic line 10b and via the opening pressure limiting valve 40b of the pressure protection device 40. As a result, the feeder device 2 is braked to a stop within a short period of time.

To then decelerate the chopper device 3, the control system 15, with the pump 11 set to a displacement of zero, cuts off the hydraulic motor 12. The drive train 4 then is isolated from the drive motor 6 by uncoupling the coupling device 5, which is actuated by the electronic control system 15, so that the pump 11 is driven by the chopper device 3 which is still in motion. Then, after the cutoff of the hydraulic motor 12 by the control system 15, the pump 11 is set by a corresponding actuation of the actuator device 21, and, thus, of the positioning valve 18, to the maximum displacement volume. The pump 11 driven by the chopper device 3 thereby delivers hydraulic fluid into the hydraulic line 10a. Because the cut off hydraulic motor 12 cannot absorb the volumetric flow delivered by the pump 11, the pump 11 delivers into the hydraulic line 10a and via the opening pressure limiting valve 40a of the pressure protection device 40, so that the chopper device 3 can be decelerated to a stop in a short period of time.

To cut off the hydraulic motor 12 during the fast stop of the chopper device 3, in FIG. 1 the hydraulic motor 12 is switched by the electronic control system 15 (by a corresponding actuation of the positioning valve 27) from the position with maximum displacement volume into the position with a displacement volume of zero, so that the hydraulic motor 12 cannot absorb the displacement delivered by the pump 11 and the chopper device 3 is braked by the pressure limiting device 40. In FIG. 1, for this purpose, the actuation and energization of the actuation device 30, which actuates the positioning valve 18 (which is in the form of a switched valve) is ended, so that the hydraulic motor 12 is switched into the position with a displacement volume of zero.

In FIG. 2, to cut off the hydraulic motor 12 during the fast stopping of the chopper device 3 by the electronic control system 15, the shutoff valve 50 located in the inlet-side hydraulic line 10a of the hydraulic motor 12 is actuated into the shutoff position by actuating the pilot valve 55 into the shutoff position 55a. For this purpose, in FIG. 2, the actuation and energization of the actuation device 56 of the pilot valve 55 (which is in the form of the switched valve) are ended, so that the hydraulic fluid flowing into the control pressure chamber 52 via the control line 53 can no longer flow out to the reservoir and a control pressure that actuates the valve body 51 into the shutoff position is built up in the control pressure chamber 54. The displacement flow delivered by the pump 11 into the hydraulic line 10a can, therefore, no longer flow to the hydraulic motor 12 when the shutoff valve 50 is in the shutoff position, so that the chopper device 3 is braked to a stop by the pressure limiting device 4Q.

In FIG. 3, to cut off the hydraulic motor 12 during the fast stopping of the chopper device 3, the braking device 70 is actuated into the braking position by the electronic control system 15. In FIG. 3, for this purpose, the actuation and energization of the actuator device 77 is ended, so that the control valve 75 (which is in the form of the switched valve) is actuated into the braking position 75b and the braking device 70, which is in the form of a spring-loaded brake, is actuated by the spring device 73 into the braking position. Because the braking device 70 has been actuated into the braking position, the hydraulic motor 12 cannot start and, therefore, cannot absorb the displacement flow delivered by the pump 11, so that the chopper device 3 is braked by the pressure limiting device 40.

With the anti-cavitation valves 60a, 60b, during a fast stop of the feeder device 2 and of the chopper device 3, a loss of pressure on the low-pressure side of the closed circuit can be avoided.

With the drive system of the invention, by the use of the pump 11, which can be set in a short period of time to the displacement volume zero or to the maximum displacement volume, it is possible to achieve a fast stop of the feeder device 2 and of the chopper device 3 in a simple manner and with little added construction effort or expense. The cutting off of the hydraulic motor 12 prevents, in a simple manner, a restart of the feeder device 2 when the pump 11 is set to the maximum displacement for the braking of the chopper device 3.

In the exemplary embodiment illustrated in FIGS. 1 and 3, no additional valves in the hydraulic lines 10a, 10b of the closed circuit are necessary for the fast stopping of the feeder device 2 and of the chopper device 3. The pump 11 can be set to the displacement zero or to the maximum displacement volume with little added construction effort and expense, by a simply constructed positioning valve 18, which has only two control positions and a proportional magnet as the actuator device 21. In FIG. 2, only a simply constructed shutoff valve 50 is necessary as the normally open valve to cut off the hydraulic motor 12, which has an open position and a closed position, and after the fast stopping of the feeder device 2, is actuated into the closed position to cut off the hydraulic motor 12. Because the shutoff valve 50 does not generate any braking pressure for the fast stopping of the feeder device 2, the shutoff valve 50 can be a simply constructed switched valve, which does not require a bypass connection to bypass the hydraulic motor 12.

The pump 11 in FIGS. 1-3 delivers in the opposite direction in the position with minimum displacement volume. The position with the displacement volume zero therefore lies within the range of variation of the pump 11. With this design of the minimum displacement volume of the pump 11, a reversing operation of the feeder device 2 is achieved in a simple manner, so that, after the fast stop of the feeder device 2 and of the chopper device 3, the harvested material that has been taken in can then be discharged from the feeder device 2.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A drive system for driving a chopper and feeder device of a harvesting machine, comprising:
   a chopper and feeder device comprising a feeder device and a chopper device;
   a drive train for driving the feeder device and the chopper device, wherein the drive train is connected by a coupling device with a drive motor;
   a hydrostatic transmission for driving the feeder device, wherein the hydrostatic transmission comprises an electrically actuated variable displacement pump driven by the drive train and a hydraulic motor connected in a closed circuit to the pump, wherein the hydraulic motor is in a driving connection with the feeder device, and wherein a fast stop function is provided such that when a foreign object is detected, the chopper and feeder device is cut off;
   an electronic control system in communication with a foreign object detector; and
   a pressure protection device associated with the hydrostatic transmission,
   wherein for the fast stop function of the feeder device, the variable displacement pump is set to a displacement of zero by the electronic control system when a foreign object is detected by the foreign object detector, and the feeder device is braked by the pressure protection device of the closed circuit, and
   wherein for the fast stop function of the chopper device, when the variable displacement pump is set to a displacement of zero, the hydraulic motor is cut off by the electronic control system, the drive train is isolated from the drive motor by uncoupling the coupling device via the electronic control system, the variable displacement pump is set to the maximum displacement volume by the electronic control system, and the chopper device is braked by the pressure protection device of the closed circuit.

2. The drive system as recited in claim 1, wherein the hydraulic motor is a variable displacement electrically actuated motor adjustable between a position with a displacement volume of zero and a position with a maximum displacement volume, whereby to cut off the hydraulic motor, the hydraulic motor is set by the electronic control system into the position with a displacement volume of zero.

3. The drive system as recited in claim 2, wherein in a non-actuated state, the hydraulic motor is set to the position with a displacement volume of zero.

4. The drive system as recited in claim 1, wherein the hydraulic motor is a constant displacement motor with a constant displacement volume, whereby to cut off the hydraulic motor, a shutoff valve that is actuated electrically by the electronic control system is located in a hydraulic line of the closed circuit.

5. The drive system as recited in claim 4, wherein to cut off the hydraulic motor, the shutoff valve is actuated by the electronic control system into a shutoff position that shuts off the hydraulic line.

6. The drive system as recited in claim 4, wherein the shutoff valve is actuated by an electrically actuatable pilot valve between an open position and a closed position, wherein the pilot valve is actuated by the electronic control system.

7. The drive system as recited in claim 6, wherein the shutoff valve includes a control pressure chamber that acts in a direction of a closed position and is in communication with the hydraulic line, wherein the pilot valve is connected with a control pressure chamber and in an open position depressurizes the control pressure chamber to a reservoir, and in a closed position cuts off a connection of the control pressure chamber to the reservoir.

8. The drive system as recited in claim 6, wherein the pilot valve is actuated by the electronic control system into the closed position to cut off the hydraulic motor.

9. The drive system as recited in claim 6, wherein in a non-actuated state, the pilot valve is pressurized into the closed position.

10. The drive system as recited in claim 1, wherein the hydraulic motor is a constant displacement motor, wherein to cut off the hydraulic motor, a mechanical braking device is in communication with the hydraulic motor, which braking device is switched by the electronic control device between a braking position and a released position.

11. The drive system as recited in claim 10, wherein for cut off of the hydraulic motor, the braking device is actuated by the electronic control system into the braking position.

12. The drive system as recited in claim 10, wherein the braking device is a hydraulically releasable spring-loaded brake, wherein for the actuation of the braking device, a control valve is actuated electrically by the electronic control system between the braking position and a released position.

13. The drive system as recited in claim 12, wherein the control valve has a released position in which a brake release pressure chamber of the spring-loaded brake is in communication with a control pressure source, and has a braking position in which the brake release pressure compartment is depressurized to a reservoir.

14. The drive system as recited in claim 12, wherein the control valve for the cutoff of the hydraulic motor is actuated by the control system into the braking position.

15. The drive system as recited in claim 12, wherein the control valve in the non-actuated state is pressurized into the braking position.

16. The drive system as recited in claim 1, wherein the coupling device is a magnetic coupling that is actuated by the electronic control system.

17. The drive system as recited in claim 1, wherein the pressure protection device comprises pressure limiting valves associated with the hydraulic lines of the closed circuit.

18. The drive system as recited in claim 1, including anti-cavitation valves connected with the hydraulic lines of the closed circuit.

19. A harvesting machine including a drive system as recited in claim 1.

\* \* \* \* \*